June 12, 1962 R. C. MINNICK ET AL 3,039,083

MULTI-BIT NON-DESTRUCTIVE MEMORY READOUT APPARATUS

Filed Oct. 28, 1957 2 Sheets-Sheet 1

INVENTOR.
JOHN E. MEKOTA, JR.
ROBERT C. MINNICK

BY Henry L. Hanson

ATTORNEY

INVENTOR.
JOHN E. MEKOTA, JR.
ROBERT C. MINNICK
BY
ATTORNEY

United States Patent Office 3,039,083

Patented June 12, 1962

3,039,083

MULTI-BIT NON-DESTRUCTIVE MEMORY READOUT APPARATUS

Robert C. Minnick, Arcadia, Calif., and John E. Mekota, Jr., Belmont, Mass., assignors to Minneapolis-Honeywell Regulator Company, Minneapolis, Minn., a corporation of Delaware Filed Oct. 28, 1957, Ser. No. 692,868

2 Claims. (Cl. 340—174)

Figure 1:
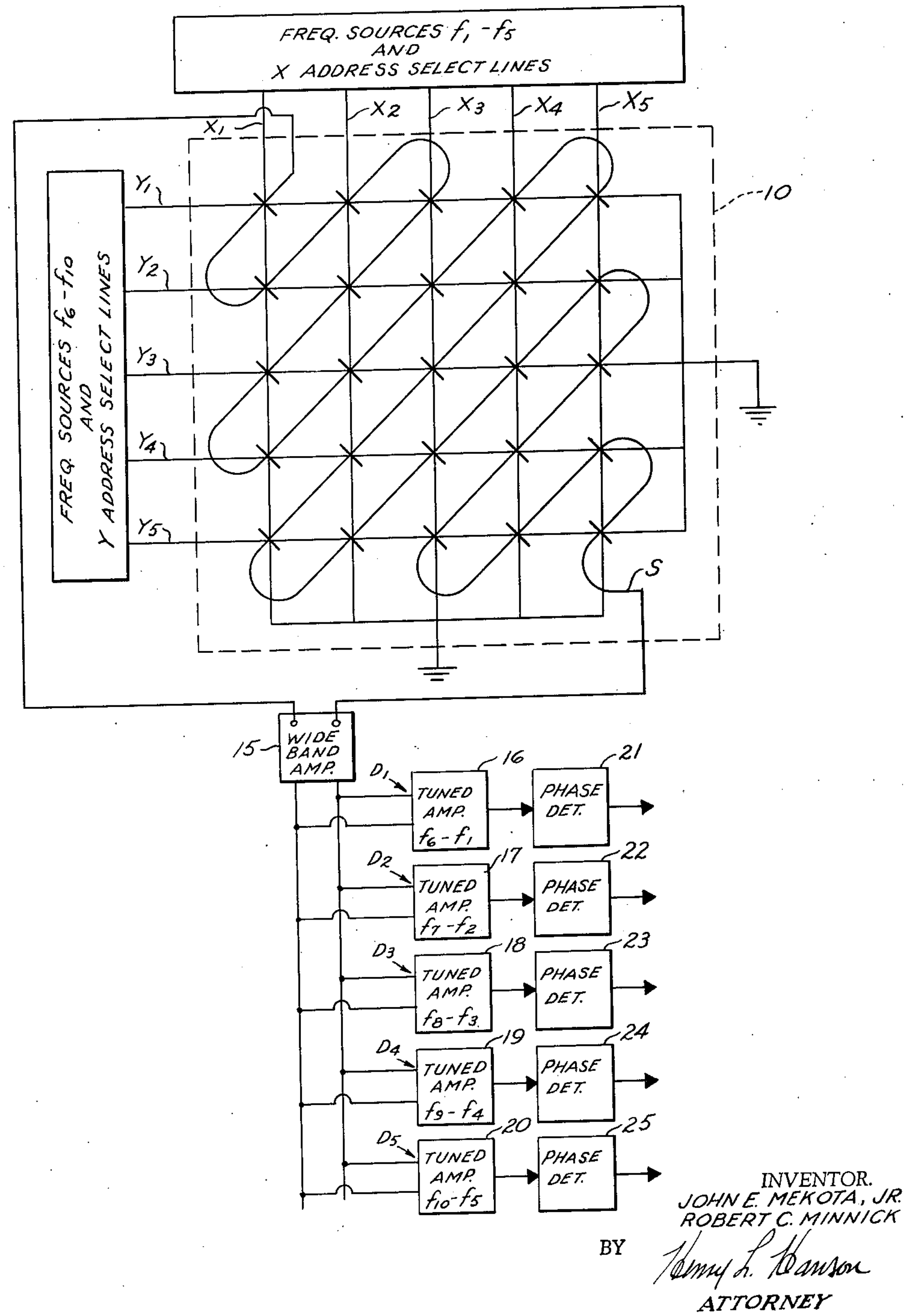

A general object of the present invention is to provide a new and improved apparatus for the storage of digital information. More particularly, the present invention is concerned with an improved digital data storage apparatus or memory circuit which is characterized by its being capable of providing simultaneous access to a number of storage locations in the memory circuit without destroying the data stored therein.

In certain fields of digital data processing, there has occurred the need for numerous data processing machines to operate upon a particular data processing problem. When programmed data processing machines are used, standardization of the orders or directions for the machine permits these orders or directions to be stored in a common location. Further, the operands used may also be needed in more than one machine and consequently they may be stored in a common location. Consequently, with a common memory system for a number of data processing machines, it is possible to considerably reduce the amount of memory circuitry required for any one installation.

In another area in the data processing field, it is sometimes desirable to have the simultaneous access of a pair of operands of an arithmetic operation in order to speed up the processing of that information in a single data processing machine. Further, it may also be desirable to select the control order for those operands, or possibly the next control order to be performed after these operands have been used, and the simultaneous selection of the next order at the time that the operands are selected yields a further advantage in time in the handling of any particular data processing problem.

Inasmuch as simultaneous access may be made to a memory circuit by a number of machines, it may be desired that the information which is read be retained in an active state in the memory circuit so that it will be available the next time an inquiry is made in the memory circuit. Consequently, it is desirable that a simultaneous access system be provided wherein a read out from the memory circuit is nondestructive.

It is accordingly a more specific object of the present invention to provide a simultaneous access memory circuit utilizing storage elements which may be interrogated by one or more interrogating circuits without destroying the information in the elements.

In an article entitled "A Radio-Frequency Non-Destructive Readout for Magnetic-Core Memories" by Bernard Widrow in the December 1954 Transactions of the I.R.E., starting at page 12, there is disclosed a memory interrogating circuit utilizing two differing RF signals which are applied to a pair of selection wires uniquely common to a magnetic core which is placed at the intersection of the two selection wires. A sense wire passed through the core will have a signal on the output which is representative of the difference frequency between the two RF signals and will be of one phase or of a phase 180° displaced therefrom depending upon the state of the residual magnetism of the magnetic core.

It has been found that a number of magnetic cores in a core array may be simultaneously interrogated by utilizing a plurality of RF signals. The selection of the RF signals is important for the reason that when a number of RF signals are applied to a number of selection wires in any particular array, it is essential that the difference frequencies for any two RF selection signals be different than the difference frequency of any other two RF selection signals. Further, the difference frequencies between any two selection frequencies, other than those for selecting a particular core, must be outside of a predetermined frequency band so as to avoid interference with valid information that may be read from the core array.

It is accordingly another more specific object of the present invention to provide a simultaneous access memory circuit utilizing a plurality of RF signal sources selected so that their difference frequencies may be used to uniquely define a number of locations in the memory circuit and other unwanted signals will be disregarded.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 2:
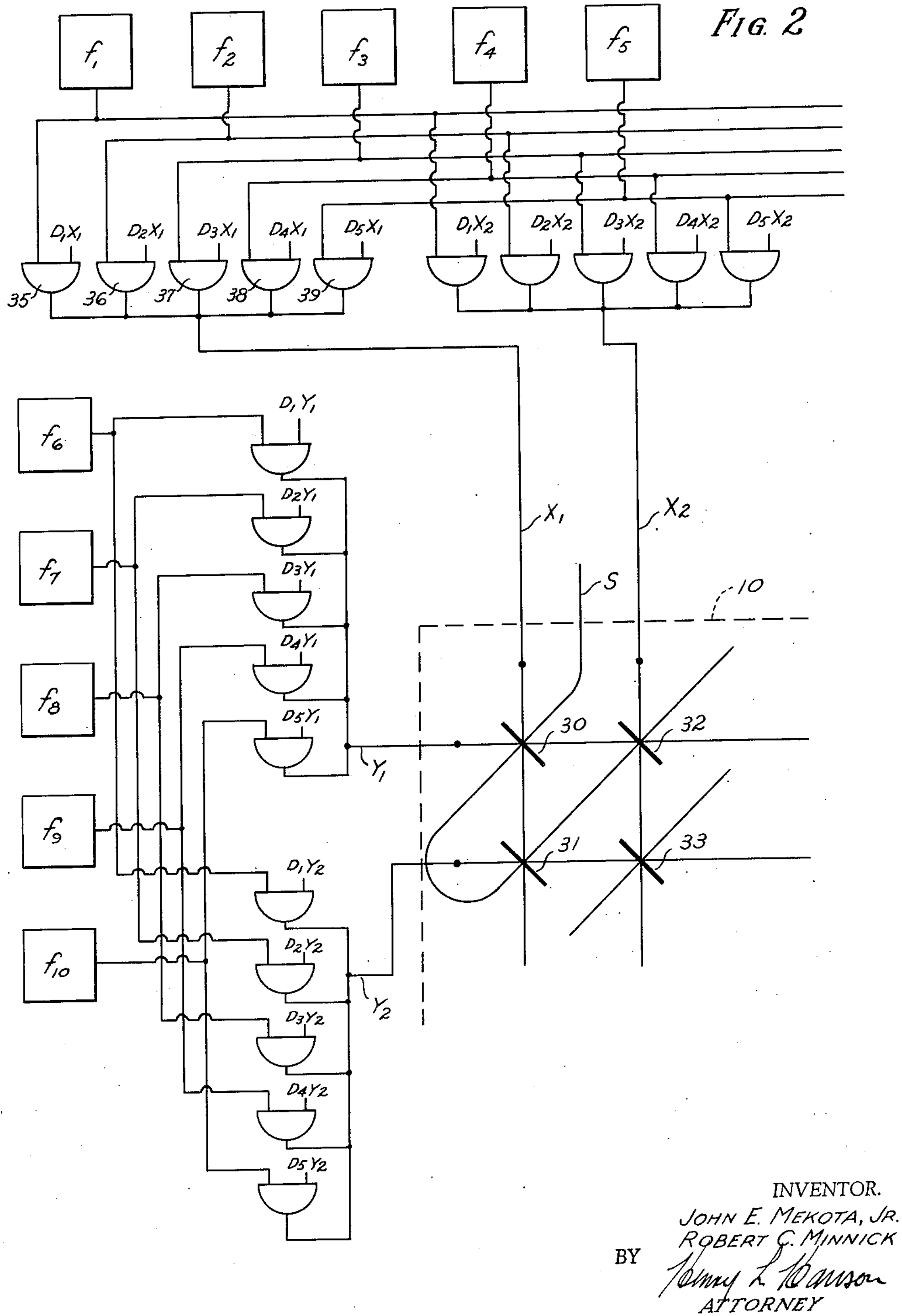

Of the drawings:

FIGURE 1 is a diagrammatic representation of a representative memory plane and the associated input and output circuitry; and FIGURE 2 is a further diagrammatic showing of the logical circuitry utilized on the input address selection circuits.

Referring first to FIGURE 1, the numeral 10 represents a memory plane which comprises a plurality of magnetic storage elements arranged in an array. The elements of the array are positioned in rows and columns for ease of identification and location. The magnetic elements in the array may well be any suitable ferroelectric type core material which takes the form of preformed toroidal cores, deposited cores, or the like. The material of the cores is preferably of the type having a relatively high residual magnetism as characteristically present in materials having a rectangular hysteresis characteristic. The array 10 may be seen to comprise five horizontal or X axis selection wires, $X_1$, $X_2$, $X_3$, $X_4$, and $X_5$. The array 10 may also be seen to comprise five vertical or Y axis selection wires $Y_1$, $Y_2$, $Y_3$, $Y_4$, and $Y_5$. At the intersection of each of these X axis and Y axis selection wires, there is positioned a magnetic core element which is adapted to be set in one or the other of two stable states. The two stable states of each storage element are conventionally used to indicate the storage of a binary zero or a binary one depending upon the particular stable state to which the element may be switched.

In order to sense the signals stored in the cores of the array 10, there is provided a sense winding S which is adapted to intercept all of the cores of the array.

The array 10 as described thus far may be considered to be of the basic type disclosed by J. W. Forrester in an article entitled, "Digital Information Storage in Three Dimensions Using Magnetic Cores" in the Journal of Applied Physics, volume 22, pages 44–48, January 1951. In a core array of the type discussed by Forrester, the writing of information into any one particular core may be effected by the simultaneous application of a select signal to the horizontal and vertical select wire which is common to the particular core to be selected. This generally involves the application of a half select current to each of the two select wires so that a full select current will be present and will switch the core from one stable state to the other. This type of memory array is sometimes referred to as a coincident-current memory circuit. There must be coincidence of signals on the select wires common to a core in order to effect a switching of the core. Insofar as the present invention is concerned, it is assumed that the cores in the array 10 have been previously set or reset to indicate the storage of information bits in accordance with desired locations in the array.

As pointed out above, it is desirable that there be provided means for permitting the simultaneous access to a number of locations in the array at any one instant. It is further desired that this access be performed without destroying the information which is stored in the array. This is achieved in the present invention by utilizing RF frequencies which are adapted to be selectively applied to the desired selection wires in the horizontal and vertical dimensions in order to produce a difference frequency which will be picked up in the sense wire S and whose phase will be indicative of whether or not a binary one or binary zero has been stored in the core selected.

In order to achieve the desired simultaneous access in the present invention, a plurality of RF frequency sources $f_1$–$f_5$ have been provided for selective application to the X address select lines $X_1$, $X_2$, $X_3$, $X_4$ and $X_5$. The vertical selection wires have associated therewith a plurality of RF frequency sources having frequency designations $f_6$—$f_{10}$. The frequency sources and the address selection circuitry is more fully described in connection with FIGURE 2. Continuing in FIGURE 1, the sense wire S is connected so that the signals picked up in the sense wire S are applied to a wide band amplifier 15 which raises the signal levels from the sense wire so that the signals may be applied to a plurality of tuned amplifiers 16, 17, 18, 19 and 20, all having their inputs connected to the output of the amplifier 15, the latter being used in those instances where the signal level from the sense wire requires such.

The tuned amplifier 16 has its output connected to a suitable phase detector 21. The amplifier 17 has its output connected to a phase detector 22. The amplifiers 18, 19 and 20 each have their outputs connected to phase detectors 23, 24 and 25 respectively. Each tuned amplifier and associated phase detector may be considered a part of a unit detection circuit. Thus $D_1$ identifies the detection circuit which includes the amplifier 16 and the detector 21 and may serve as the communicating link to a particular data processing apparatus, not shown. The amplifier 17 and the detector 22 may be considered as a part of the detection circuit $D_2$. The amplifier 18 of the phase detector 23 may likewise be considered a part of the detection circuit $D_3$. Detection circuits $D_4$ and $D_5$ will be seen to comprise the amplifier 19 and detector 24, and the amplifier 20 and detector 25, respectively.

Each of the tuned amplifiers 16–20 is tuned to provide a very narrow band pass such that only the difference frequency of two predetermined RF signals from the selection circuitry may pass. Thus, the tuned amplifier 16 will respond only to the difference frequencies defined by the difference between the RF signals $f_6$—$f_1$. Amplifier 17 is tuned to respond only to the difference frequency defined by $f_7$—$f_2$. As illustrated in the drawing, the amplifier 18 is tuned to the difference frequency between $f_8$—$f_3$, the amplifier 19 is tuned to the difference frequency between $f_9$—$f_4$, and the amplifier 20 is tuned to the difference frequency between $f_{10}$—$f_5$.

In operating the circuit of FIGURE 1, it is essential that a device associated with a detection circuit interrogate only one core location at a time. In other words, if the circuit $D_1$ is interrogating the core located at the intersection of the selection wires $X_1$ and $Y_1$, and with frequencies $f_6$ and $f_1$, this is the only core location that the detector is permitted to interrogate at any one instant. However, it is possible for more than one detector circuit to interrogate the same core. Thus, the detection circuit $D_2$ may also be interrogating the core located at the intersection of the $X_1$ and $Y_1$ selection wires. The interrogation for the detection circuit $D_2$ will be by way of the frequencies $f_7$ and $f_2$ so that the difference frequency, which is different than the difference frequency for the detection circuit $D_1$, may also be read and used to determine the status of the core at that address location.

The detection circuit $D_3$ may be reading the data at some other location such as the core location defined by the intersection of the selection wires $X_3$ and $Y_5$. The frequencies used in this instance will be $f_8$ and $f_3$ so that the difference frequency will be passed through the tuned amplifier 18 to detector circuit 23. It will be apparent from the circuitry illustrated in FIGURE 1 that the detection circuits $D_4$ and $D_5$ may likewise be observing any one desired core location in the array.

As described in the aforementioned article by Widrow, the phase detector output may take the form of a pulse when the phase of the respective difference frequencies indicates a "one" is present in the core location interrogated. The phase detector output will be zero or no pulse when there is a "zero" stored in the particular core location interrogated.

Referring to FIGURE 2, there is here illustrated a more detailed logical circuitry for selecting a particular core location in the array 10. For purposes of illustration, only four cores from the array 10 have been illustrated in FIGURE 2 and these cores are identified by the numerals 30, 31, 32, and 33. The core 30 is positioned at the intersection of the horizontal select wire $X_1$ and the vertical select wire $Y_1$. Core 31 is positioned at the intersection of the select wires $X_1$ and $Y_2$. The core 32 is positioned at the intersection of the core select lines $X_2$ and $Y_1$ while the core 33 is positioned at the intersection of the select lines $X_2$ and $Y_2$.

Each select wire has connected thereto five "AND" gate circuits, any one of which, when activated by its input gate legs, is capable of passing the desired radio frequency signal through to the selection wire. Thus, the select wire $X_1$ has connected thereto five gating circuits 35, 36, 37, 38, and 39. The gate 35 has connected to the input thereof two signal lines, the first being from the radio frequency source $f_1$ and the other being from an $X_1$ address selection line for the detector $D_1$. The gate 36 has two inputs, one being from the second radio frequency source $f_2$ and the other being from the $X_1$ address selection line for the detector circuit $D_2$. The gate 37 has two inputs, the first being from the RF source $f_3$ and the second being from the address selection circuitry for the detector $D_3$ for the $X_1$ line. The gate circuit 38 has an input from the RF source $f_4$ and a further input from the detector circuit address selection line for the detector $D_4$. The gate 39 has two inputs, one being from the RF source $f_5$ and the other being from the detection circuit $D_5$ for the address selection circuitry for the line $X_1$. It will be apparent that other forms of selection circuits may be used in lieu of the gates which have been illustrated.

It will be apparent that the gating circuits for the other selection lines correspond to those of the selection line $X_1$. It should further be noted that only two RF signals are associated with each detection circuit, in the manner set forth in FIGURE 1. Thus, the detection circuit $D_1$ has only the RF sources $f_6$ and $f_1$ associated therewith.

It will be readily apparent that any one or more of the four cores illustrated in FIGURE 2 may be simultaneously selected by one or more of the five detection circuits $D_1$–$D_5$. Thus, all of the cores may have selection signals applied thereto. The following table will serve to illustrate one manner in which the cores 30–33 may be interrogated by the circuits illustrated in FIGURE 2:

| Detection Circuit | Desired Core | Address Lines | Difference Frequency on Sense Wire |
|---|---|---|---|
| $D_1$ | 30 | $D_1X_1$, $D_1Y_1$ | $f_6-f_1$. |
| $D_2$ | 33 | $D_2X_2$, $D_2Y_2$ | $f_7-f_2$. |
| $D_3$ | 32 | $D_3X_2$, $D_3Y_1$ | $f_8-f_3$. |
| $D_4$ | 31 | $D_4X_1$, $D_4Y_2$ | $f_9-f_4$. |
| $D_5$ | 32 | $D_5X_2$, $D_5Y_1$ | $f_{10}-f_5$. |

It will be readily apparent that this selection may be changed around in any desired manner, or extended to a complete array where there are a large number of cores in the array.

One of the essential features in utilizing a circuit of the present type is the proper selection of the RF signals used with the various selection wires. The reason for this will be apparent when it is noted that there is such a large number of radio frequency signals which may be circulating in the memory on any one instant. Thus, the frequency selected must be such that the difference frequencies will always fall within the desired band pass and any unwanted frequency will be outside of the range and can not be detected or cause erroneous information to be indicated on the phase detectors, as illustrated in FIGURE 1.

The selection of frequencies to be used in any one type of array may be generalized in the following manner:

Assume one or more of $n$-RF frequencies $x_1, x_2, \ldots x_n$, to be applied to any one or more of the X select wires, and similarly for $n$ frequencies $y_1, y_2, \ldots y_n$, on the Y select wires. A given pair of signals $(x_i, y_i)$ identify the source $i$ of the interrogation. An appropriate filter on the output line will separate out the information (a phase at frequency $|x_i-y_i|$) as to the state of the interrogated core.

To determine the RF frequencies needed for such a complete system, there is no loss in generality in assuming $x_{i+1}>x_i$ and $y_{i+1}>y_i$ and $y_i>x_i$. Further, the results will be determined in terms of the arbitrary frequency $x_1$. The $n$ frequencies on the output wires will be $f+\delta$, $f+2\delta$, $\ldots$ $f+n\delta$, where $f$ and $\delta$ are arbitrary frequencies. The equations which relate the frequencies are:

First, the expression for the existence of $n$ valid channels:

$$y_i-x_i=f+i\delta$$

Second, the expression of the condition that difference frequencies resulting from wires $x_i$ and $y_j$ $(i\neq j)$ crossing, be outside the valid band:

$$|y_j-x_i|\geq f+(n+1)\delta$$

Furthermore, if two external devices interrogate the same wire simultaneously, difference frequencies are formed of the sort $|x_i-x_j|$, and $|y_i-y_j|$. These also must be outside the band. But we have required that $x_{i+1}>x_i$ and $y_{i+1}>y_i$, so this requirement is expressed by:

$$\left\{\begin{array}{l} x_i+1\geq x_i+f+(n+1)\delta \\ y_i+1\geq y_i+f+(n+1)\delta \end{array}\right\}$$

These relations can be shown to become:

$$\left\{\begin{array}{l} x_i+1=x_i+2f+(n+1+i)\delta \\ y_i+1=x_i+1+f+(i+1)\delta \end{array}\right\}$$

The solutions to these difference equations are:

$$\left\{\begin{array}{l} x_{i+1}=x_1+2if+i\left(n+\dfrac{i+3}{2}\right)\delta \\ y_{i+1}=x_1+(2i+1)f+(2in+i^2+5i+2)\dfrac{\delta}{2} \end{array}\right\}$$

The final equations represent the result. To illustrate, suppose the number of positions $n$ to be interrogated is 3; then tabulate the magnitude of all the frequency differences of $(x_1, x_2, x_3, y_1, y_2, y_3)$ where $x_1=f_1$, $x_2=f_2$, $x_3=f_3$, $y_1=f_6$, $y_2=f_7$, and $y_3=f_8$, to equate the table to the description of FIGURES 1 and 2. Using the foregoing equations, the following table may be developed:

*Frequency Comparison Table*

| | $D_1X=f_1$ | $D_2X=f_2=f_1+2f+(n+2)\delta$ | $D_3X=f_3=f_1+4f+(2n+5)\delta$ |
|---|---|---|---|
| $D_1Y_1=f_6=f_1+f+\delta$ | $\underline{f+\delta}$ | $f+(n+1)\delta$ | $3f+(2n+4)\delta$ |
| $D_2Y=f_7=f_1+3f+(n+4)\delta$ | $3f+(n+4)\delta$ | $\underline{f+2\delta}$ | $f+(n+1)\delta$ |
| $D_3Y=f_8=f_1+5f+(2n+8)\delta$ | $5f+(2n+8)\delta$ | $3f+(n+6)\delta$ | $\underline{f+3\delta}$ |

The underlined entries represent frequencies in the valid band. The others are outside the band. From this table, it will be seen that for detector circuit $D_1$, the X axis frequency is $f_1$. The Y axis frequency for the detector circuit $D_1$ will be $f_6$ or $f_1+f+\delta$. The difference frequency will then be $\underline{f+\delta}$ which is a frequency in the desired band. The other frequencies for differences between $f_6$ and $f_2$ or $f_3$ will be outside the desired band.

It will be apparent that the principles set forth in the foregoing table and the limits of the table itself may be extended to a large number of frequency differences and that the principles of the invention are applicable to a simultaneous access system including a number of points far in excess of the five which have been discussed herein.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure by Letters Patent is:

1. Apparatus for simultaneously and non-destructively interrogating a plurality of electrical storage elements having substantially rectangular hysteresis characteristics and being arranged to form a multiple bit digital data storage means comprising first and second oscillating signal sources, said first and second signal sources being selected to have an output frequency such that the difference frequency is of a first value, third and fourth oscillating signal sources, said third and fourth signal sources being selected to have an output frequency such that the difference frequency is of a second value different than said first value, said difference frequencies of said first and second values being within a desired frequency band and all other difference frequencies between the signal sources being outside of said frequency band, a plurality of selection lines selectively coupled to said storage means, each combination of two of said selection lines uniquely defining the position of a storage element in said storage means, a plurality of address selection means connected to said selection lines and adapted to connect simultaneously selected ones of said oscillating signal sources to the storage elements to be sensed, a single sense line coupled to the storage elements in said storage means, and a plurality of difference frequency sensitive means connected to said sense line, said frequency sensitive means each being tuned to the difference frequencies of said first and second values from said signal sources within said desired frequency band.

2. Apparatus for simultaneously interrogating a plurality of bistable electrical storage elements having substantially rectangular hysteresis characteristics and being arranged to form a multiple bit digital data storage means comprising a plurality of oscillating signal sources, said signal sources being selected in operational pairs so that the difference frequency of each operational pair is different than the difference frequency of any other operational pair and is within a desired frequency band and all other difference frequencies of all of said signal sources considered with respect to each of said signal sources other than from each operational pair are outside of said frequency band, a plurality of selection lines for said storage means, each combination of two of said selection lines uniquely defining the position of a storage element in said storage means, a plurality of address selection means connected to said selection lines and adapted to connect selected ones of said operational pairs to the storage elements to be selected, a single sense line coupled to the storage elements in said storage means, and a plurality of frequency sensitive means connected to said sense line, said frequency sensitive means each being tuned to selected difference frequencies from said signal sources within said desired frequency band.

References Cited in the file of this patent

UNITED STATES PATENTS

| | | |
|---|---|---|
| 2,408,692 | Shore | Oct. 1, 1946 |
| 2,578,133 | Hawkins | Dec. 11, 1951 |
| 2,658,942 | Durkee | Nov. 10, 1953 |
| 2,668,283 | Mullin | Feb. 2, 1954 |
| 2,845,611 | Williams | July 29, 1958 |

OTHER REFERENCES

"A Radio-Frequency Nondestructive Readout for Magnetic Core Memories" by B. Widrow, published "IRE Transactions—Electronic Computers," vol. EC-3, issue 4, December 1954, pp. 12–15.